United States Patent Office 3,517,041
Patented June 23, 1970

---

3,517,041
(ALKYL AMINO ALKYLENE) ALKYL SILYLALKYLENE MALONIC ACID, ESTER DERIVATIVES AND ACID ADDITION SALTS
John L. Scharr, Dayton, and William E. Weesner, Kettering, Ohio, assignors to Monsanto Research Corporation, St. Louis, Mo., a corporation of Delaware
No Drawing. Filed Feb. 23, 1968, Ser. No. 707,436
Int. Cl. C07f 7/10
U.S. Cl. 260—448.2     7 Claims

ABSTRACT OF THE DISCLOSURE

The organosilicon compounds represented by the formula

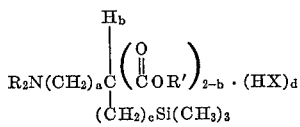

wherein R is lower alkyl, R' is hydrogen or lower alkyl, $a$ and $c$ are integers of from 1 to 5, $b$ is either 0 or 1, $d$ is either 0 or 1, and X is halogen of atomic weight greater than 25. The compounds are useful as herbicides and insecticides.

---

The invention herein described was made in the course of or under a contract with the Department of the Army.

BACKGROUND OF THE INVENTION

This invention pertains to silicon-containing carbon compounds and more particularly to certain trimethylsilylmethyl derivatives of acids and esters. The invention is further directed to the production of biological toxicant compounds.

SUMMARY OF THE INVENTION

An object of this invention is to provide novel organosilicon compounds having utility as biological toxicants. Another object is the provision of new selective herbicides and insecticides.

These and other objects hereinafter defined are met by the invention wherein there is provided the organosilicon compounds of the formula

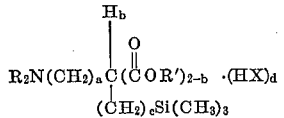

wherein R is lower alkyl, R' is selected from the group consisting of hydrogen and lower alkyl, $a$ and $c$ are integers of from 1 to 5, $b$ is either 0 or 1, $d$ is either 0 or 1, and X is halogen of atomic weight greater than 25.

Several types of compounds are encompassed by the generic formula above. Taking first the broad class where $d=0$, i.e. free of hydrogen halide, there are provided: substituted malonates, where $b=0$ and R' is lower alkyl; substituted malonic acids, where $b=0$ and R' is hydrogen; substituted alkanoates, where $b=1$ and R' is lower alkyl; and substituted alkanoic acids, where $b=1$ and R' is hydrogen. Secondly, where $d=1$, there are provided the hydrohalides of the various compounds through neutralization of the basic nitrogen of the teritary amine group.

The organosilicon compounds of the present invention may be prepared by several methods. As a preferred method, the aminoalkyl-substituted malonates are prepared from intermediate silicon-containing malonic esters obtained by the method of Sommer, Goldberg, Barnes and Stone (Journal of the American Chemical Society, vol. 76, p. 1609 (1954)). In preparing these intermediates there may be employed certain haloalkylsilanes together with malonic esters as follows:

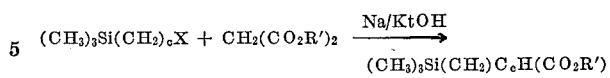

wherein $c$ is as defined above and R' is lower alkyl. The intermediates are further reacted with haloalkylamines to produce the desired aminoalkyl-substituted silicon-containing malonates as follows:

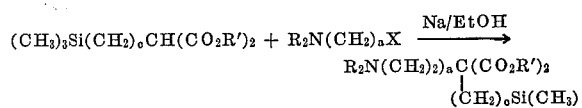

The reaction may be conducted in a solvent such as ethanol, benzene, toluene, etc. and is preferably done in two steps. In the first, sodium is reacted with the intermediate silicon-containing malonic ester and thereafter, in the second step, the haloalkylamine is added. The reactions are preferably done at the refluxing temperature of the solvent. The products are generally distillable liquids.

Specific examples of the haloalkysilanes useful in preparing the silicon-containing malonic ester intermediates are: chloromethyl-, 2-bromoethyl-, 3-chloropropyl-, 4-bromobutyl- and 5-bromopentyl-trimethysilane. Specific examples of the haloalkylamines useful in preparing the desired aminoalkyl-substituted silicon-containing malonates are: 2-chlorotriethylamine, N-(2-chloroethyl)dipropylamine, 3-chlorotripropylamine, N-(3-chloropropyl) dibutylamine, 4-chlorotributylamine, 5-chlorotripentylamine, etc.

Specific examples of the aminoalkyl-substituted silicon-containing malonate products are:

diethyl 2-(2-diethylaminoethyl)-2-trimethylsilylmethyl-malonate,
diethyl 2-(2-dipropylaminoethyl)-2-(2-trimethylsilyl-ethyl)malonate,
diethyl 2-(3-dipropylaminopropyl)-2-(3-trimethylsilyl-propyl)malonate,
diethyl 2-(4-dibutylaminobutyl)-2-trimethylsilylmethyl-malonate,
diethyl 2-(5-dipentylaminopentyl)-2-(5-trimethyl-silylpentyl)malonate, etc.

The aminoalkyl-substituted silicon-containing malonic acids of this invention are prepared from the afore-disclosed malonates by conventional methods of saponification and acidification. The reaction may be conducted in aqueous alkaline solution at elevated temperatures, say 90–95° C., to form an alkali or alkaline salt, thereafter converting said salt to the desired free acid with a mineral acid, e.g. hydrochloric acid. The products are generally solids having limited solubility in water.

Specific examples of the malonic acid products are:

2-(2-diethylaminoethyl)-2-trimethylsilylmethylmalonic acid,
2-(2-dipropylaminoethyl)-2-(2-trimethylsilylethyl) malonic acid,
2-(3-dipropylaminopropyl)-2-(3-trimethylsilylpropyl) malonic acid,
2-(4-dibutylaminobutyl)-2-trimethylsilylmethylmalonic acid,
2-(5-dipentylaminopentyl)-2-(5-trimethylsilylpentyl) malonic acid, etc.

The amine-substituted silicon-containing alkanoates are prepared from the afore-disclosed malonates by partial saponification and decarboxylation. Following partial saponification with aqueous alkaline solution, the acidified monocarboxylic intermediate is separated from inorganic materials by organic solvent extraction, and is thereafter heated and decarboxylated at about 160–170° C. to yield the alkanoate. The products are generally distillable liquids.

Specific examples of thea lkanoate products are:

ethyl 4-diethylamino-2-trimethylsilylmethylbutyrate,
ethyl 4-dipropylamino-2-(2-trimethylsilylethyl)butyrate,
ethyl 5-dipropylamino-2-(3-trimethylsilylpropyl)valerate,
ethyl 6-dibutylamino-2-trimethylsilylmethylcaproate,
ethyl 7-dipentylamino-2-trimethylsilylmethylheptanoate, etc.

The amine-substituted silicon-containing alkanoic acids are prepared from the above-disclosed alkanoates by saponification and acidification. The reaction may be conducted with aqueous alkaline reagents at elevated temperatures or, preferably, to facilitate the reaction, in the presence of alcoholic solutions of the reagent where the alkanoates are not readily soluble in water. The products are generally solids.

Specific examples of the alkanoic acid products are:

4-diethylamino-2-trimethylsilylmethylbutyric acid,
4-dipropylamino-2-(2-trimethylsilylethyl)butyric acid,
5-dipropylamino-2-(3-trimethylsilylpropyl)valeric acid,
6-dibutylamino-2-trimethylsilylmethylcaproic acid,
7-dipentylamino-2-trimethylsilylmethylcaproic acid, etc.

The various hydrohalides of this invention may be prepared from the corresponding amine-substituted silicon-containing compounds by contact, either as a solid or preferably in solution, with a hydrogen halide such as HCl, HBr or HI. The products are generally sharply-melting solids, being soluble in water, alcohols and acetone; insoluble in ether.

Specific examples of the hydrohalide products are:

diethyl 2-(2-diethylaminoethyl)-2-trimethylsilylmethyl-malonate hydrochloride,
diethyl 2-(5-pentylaminopentyl)-2-(5-trimethylsilyl-pentyl)malonate hydrobromide,
2-(2-dipropylaminoethyl)-2-(2-trimethylsilylethyl)malonic acid hydrochloride,
ethyl 4-diethylamino-2-trimethylsilylmethylbutyrate hydrochloride,
ethyl 6-dibutylamino-2-trimethylsilylmethylcaproate hydroiodide,
4-diethylamino-2-trimethylsilylmethylbutyric acid hydrochloride,
7-dipentylamino-2-trimethylsilylmethylheptanoic acid hydrobromide, etc.

The products of this invention are particularly useful as herbicides, especially for pre- or post-emergence spray for control of undesired vegetation, as hereinafter disclosed. For this purpose the active ingredient may be dissolved in a solvent, or dispersed in an emulsion or even in a dusting formulation so that the active ingredient may be applied to the soil or plant surfaces in a toxic concentration in a form which enables prompt assimilation by the germinating seeds, emerging seedlings, or full grown plants. There may also be added various surface active agents as wetting or emulsifying agents, e.g., water-soluble salts of long-chain carboxylic acids, sulfonated animal, vegetable or mineral oils, etc.

The products of this invention may also be employed as insecticides, as herein disclosed. For this purpose the active ingredient is applied to the insects in a toxic concentration, e.g. in solution or in a dusting formulation.

DESCRIPTION OF THE PREFERRED EMBODIMENTS

The invention is further illustrated by, but not limited to, the following examples.

Example 1

This example illustrates the preparation of diethyl 2-(2diethylaminoethyl)-2-trimethylsilylmethylmalonate:

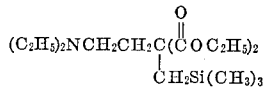

To a slurry of 2.6 g. (0.11 mole) of sodium sand in 250 ml. of toluene was added 27.9 g. (0.11 mole) of diethyl 2-trimethylsilylmethylmalonate, (see Sommer et al., Journal of the American Chemical Society, vol. 76, page 1609 (1954)) and the mixture was refluxed 1 hour. Then a toluene solution of 2-chlorotriethylamine [from 34.5 g. (0.2 mole) of the hydrochloride salt] was added, and the entire mixture refluxed 20 hours. The cooled product was filtered, and the filtrate distilled through a 2-ft. Vigreux column to give 31.6 g. (81% yield) of diethyl 2 - (2-diethylaminoethyl)-2-trimethylsilylmethylmalonate, B.P. 128–132° C./1.5 mm., $n_D^{25}$ 1.4505.

Calc'd for $C_{17}H_{35}NO_4Si$ (percent): C, 59.08; H, 10.21; N, 4.05; Si, 8.13. Found (percent): C, 59.43; H, 10.23; N, 4.38; Si, 8.11.

Example 2

This example illustrates the preparation of 2-(2-diethylaminoethyl)-2-trimethylsilylmethylmalonic acid:

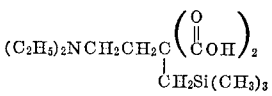

The product of Example 1, diethyl 2-(2-diethylaminoethyl) - 2 - trimethylsilylmethylmalonate, 44.0 g. (0.13 mole) was added to a hot (92°C.) alkaline solution [28.6 g. (0.51 mole) of potassium hydroxide in 50 ml. of water] and heated at 94° C. for 2 hours. Saponification was rapid as evidenced by complete solution of the reactants. The water was removed in vacuo leaving a waxy white solid which was redissolved in 100 ml. of water and treated with 48.8 ml. (0.51 mole) of 37% HCl. A white, flocculent solid persisted as the pH was adjusted to 6.5 by the addition of 20% KOH. The reaction mixture was filtered and the product dried to give 24.5 g. of white solid, M.P. 149–150° C. dec., which was identified as 2-(2-diethylaminoethyl)-2-trimethylsilylmethylmalonic acid.

Calc'd for $C_{13}H_{27}NO_4Si$ (percent): C, 53.94; H, 9.40; N, 4.84; Si, 9.70. Found (percent): C, 54.41; H, 9.42; N, 4.83; Si, 9.89.

Example 3

This example illustrates the preparation of ethyl 4-diethylamino-2-trimethylsilylmethylbutyrate:

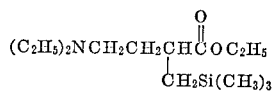

The product of Example 1, diethyl 2-(2-diethylaminoethyl) - 2 - trimethylsilylmethylmalonate, 375.0 g. (1.09 mole) was added to a hot (90° C.) alkaline solution [245.0 g. (4.35 mole) of potassium hydroxide in 500 ml. of water] in a fifteen minute period. A two-layered reaction system persisted throughout as heating at 94° C. was continued for 3 hours. The reaction mixture was cooled at 20° C. in an ice-bath while 380 ml. of 37% hydrochloric acid (4.4 mole) was added intermittently over a 3 hour period.

The reaction mixture was left at 25° C. for 18 hours (pH=6–7, by indicator paper). The reaction mixture was separated and the aqueous fraction extracted sucessively with 350 ml. of chloroform and 200 ml. of n-butyl alcohol. The combined organic fractions were returned to the reaction flask and the temperature was slowly raised to 164–168° C. over a 4 hour period. During this heating period the organic solvents were distilled off and a total of 188 ml. of water was collected from a Dean- Stark apparatus. The reaction product was then heated an additional 18 hours at 164–168° C. giving a negative $CO_2$ test with $Ba(OH)_2$ at the end of this heating period. The crude product was diluted with 1 liter of anhydrous ether, filtered to remove the inorganic salts, and the filtrate reduced to dryness leaving an amber-colored oil (259.4 g., $n_D^{25}$ 1.4428). This liquid was distilled and the fraction boiling at 93–98° C./1.5 mm. ($n_D^{25}$ 1.4412) weighed 215.2 g. (80.6% yield). This was identified as ethyl 4-diethylamino-2-trimethylsilylmethylbutyrate from the following elemental analyses:

Calc'd for $C_{14}H_{31}NO_2Si$ (percent): C, 61.48; H, 11.43; N, 5.12; Si, 10.27. Found (percent): C, 61.42; H, 11.63; N, 4.93; Si, 10.51.

A hydrochloride of ethyl 4-diethylamino-2-trimethylsilylmethylbutyrate was prepared in the following manner: an ethereal solution of the butyrate was treated with a slight excess of an ethereal solution of anhydrous hydrogen chloride. The white flocculent preciptate was recovered by filtration and the salt recrystallized from acetone/diethyl ether; M.P. 113–114.5° C. The product was identified as ethyl 4-diethylamino-2-trimethylsilylmethylbutyrate hydrochloride from the following elemental analyses:

Calc'd for $C_{14}H_{31}NO_2Si \cdot HCl$ (percent): C, 54.25; H, 10.41; N, 4.52; Si, 9.06; Cl, 11.44. Found (percent): C, 54.21; H, 10.45; N, 4.71; Si, 9.12; Cl, 11.38.

EXAMPLE 4

This example illustrates the preparation of 4-diethylamino-2-trimethylsilylmethylbutyric acid hydrochloride:

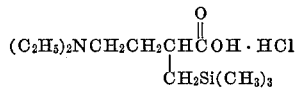

The product of Example 3, ethyl 4-diethylamino-2-trimethylsilylmethylbutyrate, 121.5 g. (0.39 mole) as the hydrochloride, was hydrolyzed for 24 hours in a refluxing solution of 110 g. (1.96 moles) of KOH, 220 ml. of water and 100 ml. of ethanol. Alcohol was distilled out and the residue made strongly acidic with 163 ml. of 37% HCl. The solution was filtered to remove a small amount of impurity. After concentrating to dryness, the solid was extracted with warm isopropanol and the solvent removed. The solid residue was recrystallized from acetone to give 88.7 g. (80.5% yield) of 4-diethylamino-2-trimethylsilylmethylbutyric acid hydrochloride, M.P. 134–136° C.

Calc'd for $C_{12}H_{27}NO_2Si \cdot HCl$ (percent): C, 51.13; H, 10.01; N, 4.97; Cl, 12.58; Si, 9.96. Found (percent): C, 51.25; H, 9.96; N, 4.89; Cl, 12.61; Si, 10.05.

EXAMPLE 5

This example illustrates the application of the products of Examples 1, 3 and 4 as herbicides.

A solution of 4-diethylamino-2-trimethylsilylmethylbutyric acid hydrochloride in acetone-water, together with a sulfonate-type emulsifying agent, was sprayed on soil containing weed and crop seeds in a concentration corresponding to 10 lbs./acre. The sprayed soil was observed two weeks later, after maintenance of conditions conducive to germination and growth of the seeds. Tomato, soybean, and radish were entirely unharmed, whereas the herbicide pre-emergent treatment produced substantial to complete suppression of the emergence and growth of wild buckwheat, and pigweed.

Separate solutions of diethyl 2-(2-diethylaminoethyl)-2-trimethylsilylmethylmalonate and ethyl 4-diethylamino-2-trimethylsilylmethylbutyrate hydrochloride in 0.5% concentration by weight in acetone-water, together with a sulfonate-type emulsifying agent, were applied to separate lots of 2-week old plants. The injuries to the plants were observed 2 weeks later. The malonate of Example 1 had no harmful effect on rye grass or brome grass, but produced substantial to complete suppression of the growth of wild buckwheat, pigweed, crab-grass, and foxtail. The butyrate hydrochloride of Example 4 had no harmful effect on soybean or rye grass, but produced substantial to complete suppression of the growth of wild buckwheat, pigweed, crab-grass, and foxtail.

EXAMPLE 6

This example illustrates the application of the product of Example 2 as an insecticide.

A solution of 2-(2-diethylaminoethyl)-2-trimethylsilylmethylmalonic acid in 2 p.p.m. concentration in acetone-water was applied to Aedes (mosquito) larvae. A 60% kill resulted.

It is to be understood that although the invention has been described with specific reference to particular embodiments thereof, it is not to be so limited since changes and alterations therein may be made which are within the full intended scope of this invention as defined by the appended claims.

What we claim is:

1. An organosilicon compound of the formula

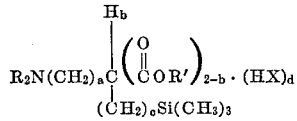

wherein R is lower alkyl, R' is selected from the group consisting of hydrogen and lower alkyl, $a$ and $c$ are integers of from 1 to 5, $b$ is either 0 or 1, $d$ is either 0 or 1, and X is halogen of atomic weight greater than 25.

2. The compound of claim 1 in which R is ethyl, R' is hydrogen or ethyl, $a$ is 2 and $c$ is 1.

3. The compound of claim 2 in which R' is ethyl, $b$ is 0, and $d$ is 0.

4. The compound of claim 2 in which R' is hydrogen, $b$ is 0 and $d$ is 0.

5. The compound of claim 2 in which R' is ethyl, $b$ is 1, and $d$ is 0.

6. The compound of claim 2 in which R' is ethyl, $b$ is 1, and $d$ is 1.

7. The compound of claim 2 in which R' is hydrogen, $b$ is 1 and $d$ is 1.

References Cited

UNITED STATES PATENTS 2,928,858　3/1960　Morehouse ＿＿＿＿＿ 260—448.2 X
3,338,943　8/1967　Speier ＿＿＿＿＿＿＿＿＿ 260—448.2

TOBIAS E. LEVOW, Primary Examiner

W. F. W. BELLAMY, Assistant Examiner

U.S. Cl. X.R.

71—106. 113; 260—448.2B; 424—184